United States Patent Office 3,781,271
Patented Dec. 25, 1973

3,781,271
PROCESS FOR THE PRODUCTION OF 14β-HYDROXY-Δ$^{16}$- AND 7α-HYDROXY-Δ$^4$-STEROIDS
Hansuli Wehrli, Schaffhausen, and Oskar Jeger, Zollikerberg, Switzerland, assignors to Ciba-Geigy Corporation, Ardsley, N.Y.
No Drawing. Filed July 20, 1971, Ser. No. 164,432
Int. Cl. C07c 173/10
U.S. Cl. 260—239.55 R                    19 Claims

ABSTRACT OF THE DISCLOSURE

The present invention concerns a process for the production of 14β-hydroxy-Δ$^{16}$-steroids and 7α-hydroxy-Δ$^4$-steroids which simultaneously are substituted in the 20- or 3-position respectively by an oxo radical and α may be further substituted as defined, and the new compounds obtained thereby the process consists in reacting corresponding 14β,15β-epoxy-20-oxo-Δ$^{16}$-steroids or 6α,7α-epoxy-3-oxo-Δ$^4$-steroids in the presence of a pallidum hydrogenation catalyst such as palladium on barium sulphate with a partially hydrogenated aromatic hydrocarbon such as cyclohexene. Compounds obtained by this process are useful as intermediates for the synthesis of batrachotoxinine A or analogs thereof. Specific embodiments are 3β-methoxy-3α,9α-epoxy-11α,18-diacetoxy-14β - hydroxy - 20-oxo-Δ$^{16}$-5β-pregnene and 3β-methoxy-3α,9α-epoxy-7α,9α,18-triacetoxy-14β-hydroxy-20-oxo-Δ$^{16}$-5β-pregnene.

The object of the present invention is a process for the production of steroid compounds of the following general Formula I

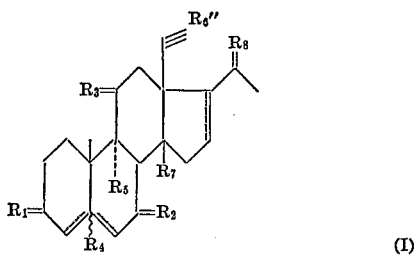

(I)

wherein a double bond is present in the 16 position and/or either the 4 position or the 5 position as indicated by the dotted lines and wherein $R_1$ represents a free or protected oxo radical, a free, or an esterified or etherified hydroxyl group and a hydrogen atom, or a free or an esterified or etherfied hydroxyl group, and together with $R_5$, an epoxy radical, or two hydrogen atoms, $R_2$ and $R_3$ each represent, independently of each other, a free or protected oxo radical, or a free, or an esterified or etherified hydroxyl group and a hydrogen atom, or two hydrogen atoms, $R_4$ represents a hydrogen atom in the α- or β-position or is part of a double bond as indicated, $R_5$ represents a hydrogen atom, a hydroxyl group or, together with $R_1$, an epoxy radical, $R_6$ represents three hydrogen atoms or a free, or an esterified or etherified hydroxyl group and two hydrogen atoms, or a free or protected oxo radical and one hydrogen atom, or an oxo radical and, together with $R_8$, an epoxy radical, $R_7$ represents a hydroxyl group or a hydrogen atom and $R_8$ represents a free or protected oxo radical, a free, or an esterified or etherified hydroxyl group and a hydrogen atom, or a hydrogen atom and, together with $R_6$, an epoxy radical, whereby either a double bond is present at least in the 16 position and simultaneously $R_8$ represents a free oxo radical and $R_7$ a hydroxyl group, or a double bond is present at least in the 4-position and simultaneously $R_1$ represents a free oxo radical and $R_2$ an α-hydroxyl group and a β-hydrogen atom, and whereby a double bond may be in the 5-position only when $R_1$ does not represent a free oxo radical.

Esterified hydroxyl groups in $R_3$, $R_6$ and $R_1$, $R_2$ or $R_8$, i.e. in the positions 11, 18 and 3, 7 or 20 are derived from lower alkanoic acids such as, in particular, acetic acid, formic acid or pivalic acid and further propionic acid, butyric acid, isobutyric acid, valeric acid or isovaleric acid, or from benzoic acid. Etherified hydroxyl groups in the positions 11, 18 and 3, 7 or 20 are, in particular, groups which are easily split, e.g. groups which can be split by acid-catalyzed solvolysis such as the tetrahydropyran-2-yloxy group, the 4-methoxy-tetrahydropyran-4-yloxy group and other ether groups which carry a second ether oxygen atom on the carbon atom linked with the primary ether oxygen atom which ether oxygen atom can be a ring member or part of an aliphatic chain, as well as the trityloxy group (triphenylmethoxy group) which can be split and under similar conditions as the above mentioned, ether groups, e.g. by heating in acetic acid. As a further preferred ether group there may be mentioned the benzyloxy group capable of being split by hydrogenolysis. Preferably in the 3β-position beneath a 3α,9α-epoxy radical ether groups derived from lower alkanols which in this position are also capable of being split under mild acidic conditions, come into consideration. Such groups, however, may occur also in the other positions according to the above definitions. The lower alkanols forming such group are e.g. ethanol, propanol, isopropanol, the butyl or amyl alcohols and, in particular, methanol. Protected oxo radicals in the positions 11 and 18 as well as 3, 7 or 20 are ketal or acetal groupings which are derived from lower alkanediols e.g. ethyleneglycol, or lower alkanols, e.g. ethanol or especially methanol.

The definition of $R_6$ as an oxo radical and, together with $R_8$, an epoxy radical corresponds to a γ-lactone grouping based on a 20-hydroxy-18-carboxylic acid of the pregnane series with the substituents and double bonds according to the definitions under Formula I.

The compounds of the general Formula I are valuable intermediates. In particular, they can be used for the production of compounds which are suitable, by virtue of their pharmacological properties, for use as medicaments.

Surprisingly, it has been found that the compounds of the general Formula I can be produced in a commercially advantageous manner by the reaction of a compound of the general Formula II

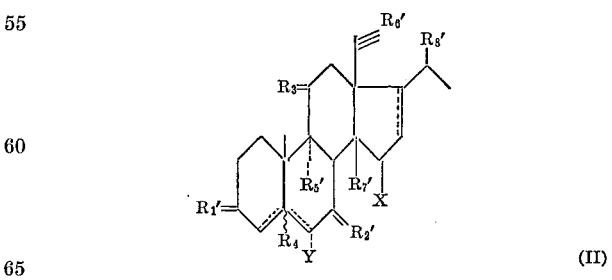

(II)

wherein a double bond is present in the 16-position and/or either the 4-position or the 5-position as indicated by the dotted lines, X either represents, together with $R_7'$, the 14β,15β-epoxy radical with simultaneous presence of a double bond in the 16-position and of a free oxo radical as $R_8'$, and of three hydrogen atoms or a free, or an esterified or etherified hydroxyl group and two hydrogen atoms or a free or protected oxo radical and one hydrogen atom as $R_6'$, or it stands for a hydrogen atom and, simultaneously $R_7'$, $R_8'$ and $R_6'$ may have all meanings given under Formula I for $R_7$, $R_8$ and $R_6$ respectively and there need not be a double bond in the 16-position, Y either represents, together with $R_2'$, the $6\alpha,7\alpha$-epoxy radical beneath a $7\beta$-hydrogen atom with simultaneous presence of a free oxo radical as $R_1'$, a hydrogen atom or a hydroxyl group as $R_5'$ and a double bond in the 4-position, or it stands for a hydrogen atom, and simultaneously $R_1'$, $R_2'$ and $R_5'$ may have all meanings given under Formula I for $R_1$, $R_2$ and $R_5$ respectively and there need be no double bond in the 4-position, whereby always one of the symbols X and Y must be part of an epoxy radical and the other must be hydrogen, whereas $R_7'$, $R_8'$, $R_6'$, $R_2'$, $R_1'$ and $R_5'$ have been defined already together with X and Y respectively, $R_3$ and $R_4$ have the meanings given under Formula I, and whereby a double bond may be in the 5-position only when $R_1'$ does not represent a free oxo radical, in the presence of a palladium hydrogenation catalyst, with a partially hydrogenated aromatic hydrocarbon. The catalysts employed can be the usual palladium catalysts, e.g. palladium on animal charcoal, or an alkaline earth metal sulphate or carbonate, such as barium sulphate, barium carbonate, strontium carbonate or calcium carbonate. Suitable as partially hydrogenated aromatic substances are, e.g. cyclohexene, cyclohexa - 1,3 - diene or -1,4-diene and 1,4,5,8-tetrahydronaphthalene, which are preferably used in an appreciable excess, e.g. to the extent of 2 to 10 times the amount by weight of the steroid to be reacted. The reaction is performed in the presence or absence of a solvent such as, e.g. methanol, ethanol, butanol, tetrahydrofuran, dioxane, diethyl ether, dibutyl ether or diethylene glycol dimethyl ether, at temperatures between approx. 35° and 150° C., or at the boiling temperature of the reaction medium. For the attainment of good yields from the reaction according to the invention it is advantageous to vigorously stir the reaction mixture and to bring it up to fast boiling by the application of a bath temperature at least 50° above the boiling point of the solvent. To process the reaction mixture, the filtrate obtained after the catalyst has been filtered off is preferably concentrated by evaporation in vacuo, and the residue caused to crystallise, or, if necessary, it is chromatographed, e.g. on aluminium oxide or on silica gel.

The starting materials of the general Formula II correspond to one of the two following narrower general Formulae IIa and IIb

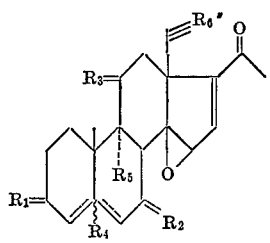

(IIa)

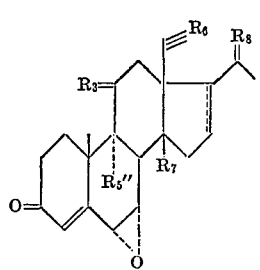

(IIb)

In the general Formula IIa $R_6''$ represents three hydrogen atoms or a free or an esterified or etherified hydroxyl group and two hydrogen atoms, or a free or protected oxo radical and one hydrogen atom, and $R_1, R_2, R_3$, $R_4$ and $R_5$ have the meanings given under the general Formula I, while a double bond may be present in position 5, or in position 4 when $R_1$ represents a free oxo radical.

In the general Formula IIb $R_5''$ represents a hydroxyl group or a hydrogen atom, and $R_3$, $R_6$, $R_7$ and $R_8$ have the meanings given under the general Formula I, while a further double bond may be present in position 16.

The starting materials of the process according to the invention corresponding to the general Formula IIa are, for their part, obtained, e.g. from compounds of the general Formula III

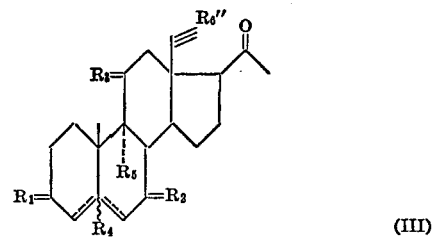

(III)

wherein $R_1$, $R_2$, $R_3$, $R_4$ and $R_5$ have the meanings given under Formula I, and $R_6''$ has the meaning given under Formula IIa, by bromination in the 17-position, e.g. by means of N-bromosuccinimide in carbon tetrachloride with exposure to light, or by means of pyridinehydrobromide-perbromide, subsequent elimination of hydrogen bromide, e.g. with the aid of lithium carbonate/lithium bromide or with dimethylformamide, bromination of the obtained $\Delta^{16}$-compounds with N-bromosuccinimide in the 15-position and repeated elimination of hydrogen bromide, e.g. with lithium carbonate/lithium bromide, to obtain compounds of the general Formula IV

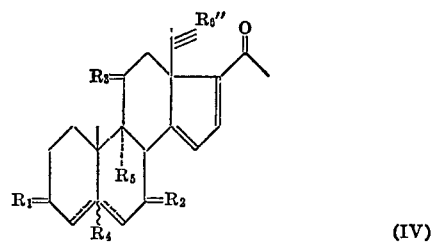

(IV)

wherein $R_1$, $R_2$, $R_3$, $R_4$, $R_5$ and $R_6''$ have the meanings given under Formula I, and epoxidation thereof, e.g. by means of p-nitroperbenzoic acid. A number of the compounds of the general Formula III having a hydrogen atom as $R_6''$ are known, and others can be produced analogously to the known compounds of this type. To produce compounds of the general Formula III having an 18-acetoxy group and two hydrogen atoms as $R_6''$, the starting material used is, e.g. $3\beta$-acetoxy-$20\beta$-hydroxy-$5\alpha$-pregnane, which can be further substituted as defined. Compounds of this type are described in the literature. $3\beta$-acetoxy-18,20-epoxy-$20\xi$-hydroxy-$5\alpha$-pregnane is obtained by oxidation with lead tetraacetate in the presence of iodine in cyclohexane, and a subsequent oxidation with chromium trioxide, as well as the subsequent reaction with silver acetate, and an aftertreatment with silica gel/water. The treatment of the last-mentioned compound with acetic anhydride/pyridine at elevated temperature yields $3\beta$,18-diacetoxy-20-oxo-$5\alpha$-pregnane which is embraced by the general Formula III. A second reaction sequence is suitable for the production of more complicated compounds of the general Formula III, wherein $R_1$ represents a 3β-methoxy group and, together with $R_5$, the 3α,9α-epoxy radical, whilst $R_6''$ is again an acetoxy group and two hydrogen atoms. An example of this reaction sequence is shown in the reaction scheme on the next page. The subsequent reaction steps are also indicated in this scheme leading via a compound of the general Formula III to a starting material of the general Formula II and eventually to an end product of Formula I.

upon acetylated with acetic anhydride/pyridine, whereby 3β - methoxy - 3α,9α - epoxy-11α,18-diacetoxy-20-oxo-5β-pregnane (7) is obtained, which is embraced by the general Formula III.

The further stages of the process correspond to the conversion, already described in general in the foregoing, of the compounds of the general Formula III into compounds of the general Formula II, followed by the process according to the invention.

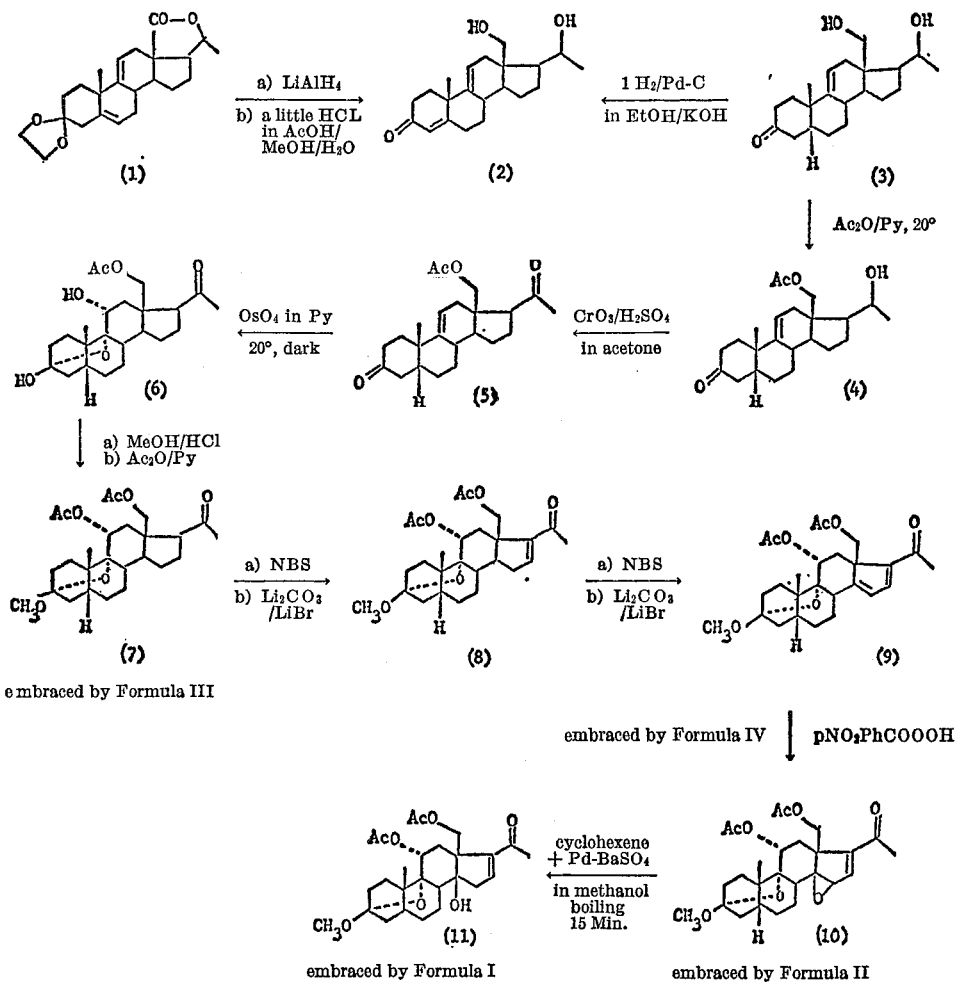

The reaction sequence commences with the known (20R) - 3 - ethylenedioxy-20-hydroxy-$\Delta^{5,9(11)}$-pregnadien-18-oic acid lactone-(→20), (1), which is first reduced with lithium aluminium hydride to obtain the 18,20-dihydroxy compound. The subsequent cleavage of the 3-ethylenedioxy group with a little hydrochloric acid in acetic acid/methanol yields (20R) - 3 - oxo - 18,20-dihydroxy-$\Delta^{4,9(11)}$-pregnadiene (2), which is hydrogenated with the calculated amount of hydrogen, in the presence of a palladium charcoal catalyst, to give (20R)-3-oxo-18,20-dihydroxy-$\Delta^{9(11)}$-5β-pregnene (3). By partial acetylation of this with acetic anhydride/pyridine at room temperature is obtained (20R) - 3 - oxo-18-acetoxy-20-hydroxy-$\Delta^{9(11)}$-5β-pregnene (4), which is oxidized with chromium trioxide/sulphuric acid in acetone to 3,20-dioxo-18-acetoxy-$\Delta^{9(11)}$-5β-pregnene (5). By treatment thereof with osmium tetroxide in pyridine, at room temperature and in darkness, is surprisingly obtained after several days 3β,11α-dihydroxy-3α,9α-epoxy-18-acetoxy-20-5β-pregnane (6). This result is in contradiction to the information given by L. F. Fieser in "Steroids," Reinhold Publishing Corporation, New York (1959), page 669, according to which $\Delta^{9(11)}$-5β-seteroids cannot be osmilized. The cyclic semiketal (6) is first ketalized with methanolic hydrogen chloride and there- A further reaction sequence is provided in connection with the explanation of the production of compounds of the general Formula IIb.

Starting materials of the general Formula IIb are obtained e.g. from compounds of the general Formula V

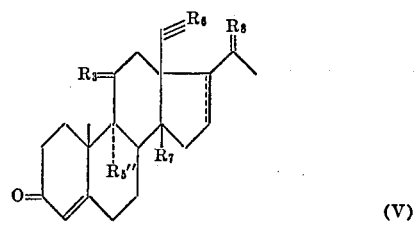

(V)

wherein $R_3$, $R_5''$, $R_6$, $R_7$ and $R_8$ have the meanings given under the general Formula I and IIb, respectively, and wherein a further double bond may be present in position 16 corresponding to the dotted line. These compounds are firstly dehydrogenated with 2,3-dichloro-5,6-dicyano-p-benzoquinone in dioxane containing hydrogen chloride. When $R_5''$ represents hydrogen, the dehydrogenation can also be carried out with chloranil. The compounds obtained of the general Formula VI

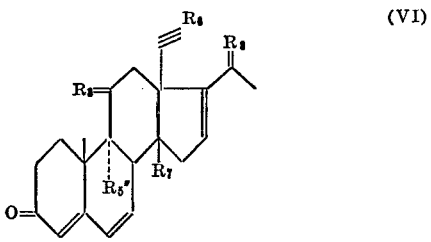

tone-(→20) [which falls within the scope of the general Formula VI] is obtained. Thereafter, by epoxidation of the latter compound with p-nitro-perbenzoic acid, (20R)-3-oxo - 6α,7α - epoxy-9α,20-dihydroxy-11α-acetoxy-Δ⁴-pregnen-18-oic acid lactone (→20) is obtained.

Another more complex reaction sequence involves the initial production of a starting material of general Formula IIb and subjection of this to the reaction of the invention. Subsequently, via a series of reaction steps, as indicated in the following reaction scheme, a starting material of general Formula IIa is obtained:

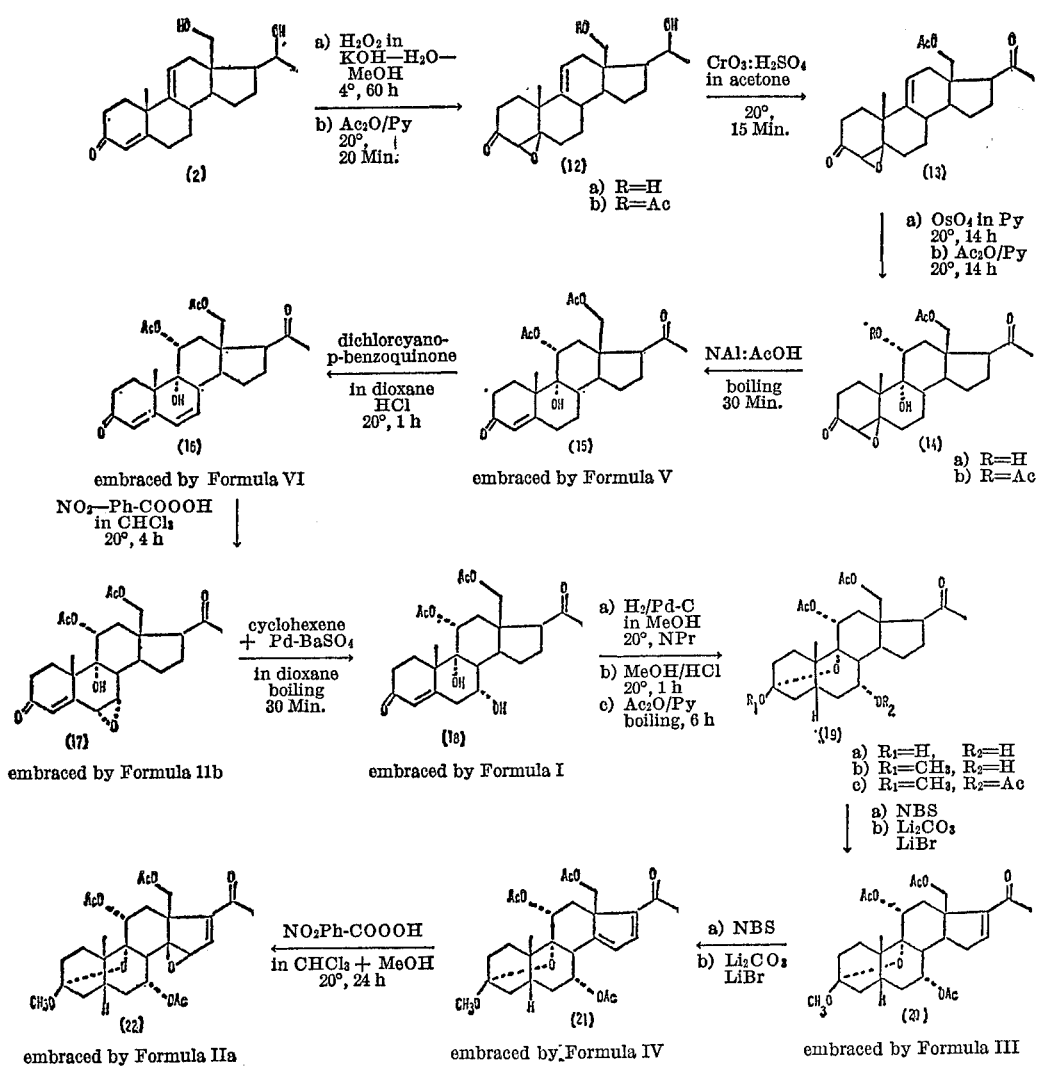

wherein $R_3$, $R_5''$, $R_6$, $R_7$ and $R_8$ have the meanings given under Formula I and IIb respectively and wherein a further double bond may be present in position 16, can be epoxidized, e.g. with p-nitro-perbenzoic acid, selectively in the 6,7-position, to yield compounds of the general Formula IIb.

For example, by reduction of (20R)-3-oxo-9α,20-dihydroxy - 11α - acetoxy - Δ⁴ - pregnen - 18 - oic acid lactone-(→D20) [which falls within the scope of the general Formula V and which may be obtained from the known (20R) - 3-oxo-20-hydroxy-Δ⁴,⁹,⁽¹¹⁾-pregnadien-18-oic acid lactone-(→20) by osmilation in pyridine at room temperature and in the dark, followed by acetylation] with 2,3-dichloro-5,6-dicyano-p-benzoquinone, (20R)-3-oxo-9α,20-dihydroxy - 11α - acetoxy - Δ⁴,⁶-pregnadien-18-oic acid lac- According to this reaction sequence, (20R)-3-oxo-18, 20-dihydroxy-Δ⁴,⁹⁽¹¹⁾-pregnadiene (2) (same compound as in the first reaction scheme) is epoxidized with hydrogen peroxide in methanolic potassium hydroxide solution in the dark, whereby a mixture of (20R)-3-oxo-4β,5β-epoxy-18,20-dihydroxy-Δ⁹⁽¹¹⁾-pregnene (12a) and a minor amount of (20R) - 3 - oxo-4α,5α-epoxy-18,20-dihydroxy-Δ⁹⁽¹¹⁾ is obtained. This mixture can be separated, e.g. by chromatography on silica gel, though the following five steps can be carried out even with the mixture, until a homogeneous substance is again obtained by the introduction of a double bond in the 4-position.

By selective acetylation of (12a) with acetanhydride-pyridine at room temperature (20R)-3-oxo-4β,5β-epoxy-18-acetoxy - 20 - hydroxy-Δ⁹⁽¹¹⁾-pregnene (12b) is first formed and this is then oxidized with chromotrioxide and 8-n sulphuric acid in acetone to yield 3,20-dioxo-4β,5β-epoxy-18-acetoxy-Δ$^{9(11)}$-pregnene (13). The reaction of the latter with osmium tetroxide in pyridine at room temperature in the dark leads to 3,20-dioxo-4β,5β-epoxy-9α,11α-dihydroxy-18-acetoxy-pregnane (14a) which is acetylated with acetanhydride-pyridine at room temperature to yield 3,20-dioxo-4β,5β-epoxy-9α-hydroxy-11α,18-diacetoxy-pregnane (14b). When the latter is boiled with sodium iodide in glacial acetic acid, 3,20-dioxo-9α-hydroxy-11α,18-diacetoxy-Δ$^4$-pregnene (15) falling within the scope of the general formula V is formed. This compound can also be obtained from the 4α,4α-epoxy-isomer of compound (12a), or in the simplest way from a mixture of the 4β,5β-epoxy- and the 4α,4α-epoxy compounds. Dehydrogenation of compound (15) with 2,3-dichloro-5,6-dicyano-p-benzoquinone in dioxan, which contains hydrogen chloride, at room temperature yields 3,20-dioxo-9α-hydroxy-11α,18-diacetoxy-Δ$^{4,6}$-pregnadiene (16) falling within the scope of Formula VI. 3,20-dioxo-6α,7α-epoxy-9α-hydroxy-11α,18-diacetoxy-Δ$^4$-pregnene embraced by the general Formula II and falling also under the narrower formula IIb is obtained therefrom by expoxidation with p-nitroperbenzoic acid in chloroform at room temperature. The reaction with cyclohexene in dioxan in the presence of a palladium-barium sulphate-catalyst at boiling temperature according to the present invention then leads to 3,20-dioxo-7α,9α-dihydroxy-11α,18-diacetoxy-Δ$^4$-pregnene (18), which falls under the general Formula I.

Hydrogenation of compound (18) in the presence of palladium-barium sulphate catalyst in methanol at room temperature and normal pressure leads to 3β,7α-dihydroxy - 3α,9α - epoxy - 11α,18-diacetoxy-20-oxo-5β-pregnane (19a) which is thereafter converted into 3β-methoxy-3α,9α - epoxy - 7α - hydroxy-11α,18-diacetoxy-20-oxo-5β-pregnane (19b) with the aid of methanol containing hydrogen chloride. Compound (19b) is acetylated with a mixture of acetanhydride and pyridine to yield 3β-methoxy - 3α,9α - epoxy - 7α,11α,18 - triacetoxy-20-oxo-5β-pregnane (19c). 3β-methoxy-3α,9α-epoxy-7α,11α,18-triacetoxy-20-oxo-Δ$^{16}$-5β-pregnene (20) is obtained therefrom by boiling with N-bromosuccinimide in carbon tetrachloride with the addition of a little azobisisobutyronitrile and exposure to light, followed by dehydrobromination effected by heating with lithium carbonate and lithium bromide in dimethylformamide. By the repetition of these two reactions 3β-methoxy-3α,9α-epoxy-7α,11α,18-triacetoxy-20-oxo-Δ$^{14,16}$-5β-pregnadiene (21), which falls under the scope of the general Formula IV is obtained. Epoxidation of said compound (21) with p-nitro-perbenzoic acid in chloroform containing 1% methanol at room temperature in the dark, finally leads to 3β-methoxy-3α,9β:14β,15β - diepoxy - 7α,11α,18 - triacetoxy - 20-oxo-Δ$^{16}$-5β-pregnene (22), which is a further starting material of the general Formula II, which at the same time is embraced by the general Formula IIa.

Of special value as intermediates are compounds of the general Formula Ia (Ia)

wherein $R_1^a$, $R_2^a$, $R_3^a$, $R_4^a$, $R_5^a$, $R_6^a$, $R_7^a$ and $R_8^a$ have the meanings given under Formula I for $R_1$, $R_2$, $R_3$, $R_4$, $R_5$, $R_6$, $R_7$ and $R_8$ respectively, and the same double bonds as indicated therein are present, however $R_5^a$ and $R_7^a$ do not simultaneously represent hyrogen atoms. Among these compounds, those are preferred wherein $R_6^a$ does not represent three hydrogen atoms. Also important as intermediates are compounds of the general formula Ia, wherein a double bond is present in the 4-position and a further double bond may be present in the 16-position, $R_1^a$ represents a free oxo radical, $R_2^a$ represents an α-hydroxyl group and a β-hydrogen atom, $R_4^a$ is part of a double bond, $R_5^a$ and $R_7^a$ are hydrogen atoms and $R_6^a$ represents three hydrogen atoms or a free or an esterified or etherified hydroxyl group and two carbon atoms or a free or protected oxo radical and one hydrogen atom.

From the compounds of the general Formulae I and Ia which can be produced according to the invention, wherein $R_6$ and $R_6^a$ respectively have any meaning according to the definition, except that of three hydrogen atoms, it is possible to produce, for example, substances having a structure similar to batrachotoxinine A, as well as this substance itself. A reaction sequence leading to the 7,8-dihydro analog of batrachotoxinine A having the most important structure characteristics of the last-mentioned is shown in the reaction scheme on this and the following page.

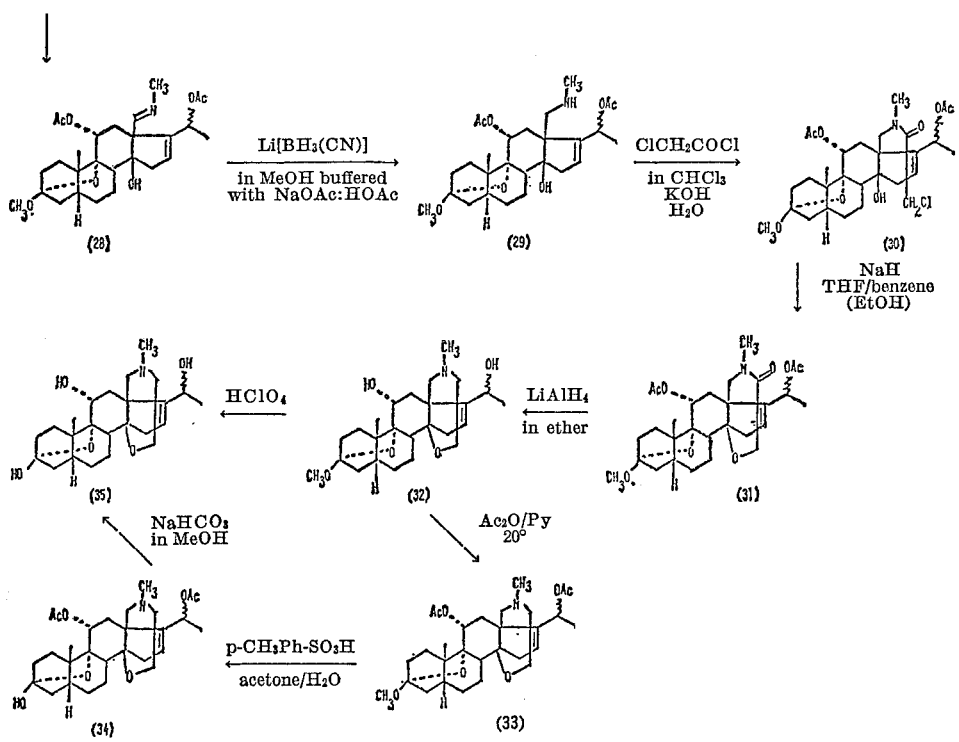

This reaction sequence commences with 3β-methoxy-3α,9α - epoxy - 11α,18 - diacetoxy - 14β - hydroxy - 20-oxo-Δ¹⁶-5β-pregnene, given already in the first reaction scheme as compound 11, which is first converted by partial hydrolysis with sodium hydroxide in aqueous dioxane into 3β - methoxy - 3α,9α-epoxy-11α-acetoxy-14β,18-dihydroxy-20-oxo-Δ¹⁶-5β-pregnene (23). The latter is oxidised either with pyridine-sulphur trioxide-complex in dimethylsulphoxide-triethylamine at room temperature according to the method of Doernig, or with chromine (VI)-compounds to yield 3β-methoxy-3α,9α-epoxy-11α-acetoxy-14β-hydroxy-18,20-dioxo-Δ¹⁶-5β-pregnene (24), wherefrom 3β,18,18-trimethoxy-3α,9α-epoxy-11α-acetoxy-14β-hydroxy-20-oxo-Δ¹⁶-5β-pregnene (25) is obtained by acetalisation with methanol containing a little hydrogen chloride, at room temperature. From compound (25), by reduction with diisobutyl aluminium hydride in toluene at —70° C. or with diisoamyl borohydride, 3β,18,18-trimethoxy - 3α,9α - epoxy - 11α - 11β,20ξ - trihydroxy - Δ¹⁶-5β-pregnene (26a) is obtained, which, by treatment with a mixture of acetanhydride and pyridine at 40° C. using a longer reaction time yields 3β,18,18-trimethoxy-3α,9α-epoxy - 11α,20ξ - diacetoxy - 14β - hydroxy - Δ¹⁶-5β-pregnene (26b). The reaction of the latter with acetone containing p-toluene-sulphonic acid at room temperature liberates the aldehyde group, thus yielding 3β-methoxy-3α,9α - epoxy - 11α,20ξ - diacetoxy - 14β - hydroxy - 18-oxo-Δ¹⁶-5β-pregnene (29) which thereafter is converted into 3β-methoxy-3α,9α-epoxy-11α,20ξ-diacetoxy-14β-hydroxy-18-(methylimino)-Δ¹⁶-5β-pregnene (28) by reaction with methylamine in benzene at room temperature using a molecular sieve as a dehydrating agent and a longer reaction time. By reduction of compound (28) with lithium-cyanoborohydride in methanol buffered with sodium acetate-acetic acid, 3β-methoxy-3α,9α-epoxy-11α,20ξ - diacetoxy - 14β - hydroxy - 18 - (methylamino)-Δ¹⁶-5β-pregnene (29) is obtained. This compound is reacted with chloroacetyl chloride in a mixture of chloroform and aqueous potassium hydroxide solution to yield 3β - methoxy - 3α,9α - epoxy - 11α,20ξ - diacetoxy - 14β-hydroxy - 18 - (N - methyl - 2 - chloroacetamido) - Δ¹⁶-5β-pregnene (30), which can be cyclised with sodium hydride in tetrahydrofuran/benzene, optionally with the addition of a little ethanol, to give 1'-methyl-2'-oxo-3β- methoxy - 3α,9α - epoxy - 11α,20ξ - diacetoxy - 14β,18-(epoxyethanoimino)-Δ¹⁶-5β-pregnene (31). By reduction of this with lithium aluminium hydride in ether with simultaneous deacetylation, is obtained 1'-methyl-3β-methoxy - 3α,9α - epoxy - 11α,20ξ-dihydroxy-14β,18-(epoxyethanoimino)-Δ¹⁶-5β-pregnene (32). The treatment of the last-mentioned with a mixture of 70% aqueous perchloric acid and glacial acetic acid at room temperature finally yields 1'-methyl-3β,11α,20ξ-trihydroxy-3α,9α-epoxy-14β,18-(epoxyethanoimino)-Δ¹⁶ - 5β - pregnene (35). According to an alternative sequence of stages, the compound (32) is first diacetylated with a mixture of acetanhydride and pyridine at room temperature to yield 1'-methyl - 3β - methoxy - 3α,9α - epoxy - 11α,20ξ - diacetoxy - 14β,18 - (epoxyethanoimino)-Δ¹⁶-5β-pregnene (33). The latter is converted, by treatment with acetone containing p-toluene sulphonic acid and water, into 1'-methyl - 3β - hydroxy - 3α,9α - epoxy - 11α,20ξ - diacetoxy-14β,18-epoxyethanoimino-Δ¹⁶-5β-pregnene (34) from which eventually the end product (35) is obtained by alkaline hydrolysis, e.g. with sodium bicarbonate in methanol.

The reductive cleavage according to the invention of 14β,15β-epoxy compounds permits, as in the foregoing reaction sequence, the production of intermediates in the production of Batrachotoxinin A and simple analogoues thereof which also contain a double bond in the 16-position as a feature of their structure. On cleavages according to the invention of 6α,7α-epoxy-compounds the existing double bond in the 4-position is retained though it may subsequently be hydrogenated. In particular the process according to the invention makes it more readily possible to obtain 7α-hydroxy-5β-pregnane compounds in good yields via two intermediate reaction steps, since the direct catalytic hydrogenation of 3-oxo-6α,7α-epoxy-$\Delta^4$-pregnene-compounds proceeds in a highly unspecific fashion and produces a mixture which is difficult to separate comprising 5β- and 5-α-pregnane compounds in varying degrees of hydrogenation which in the hydroxy group will be in part present in the 6α-position or may be absent.

The 7α-hydroxy group obtainable via the reaction according to the invention may be maintained through several subsequent reaction products as the free group or in an esterified, especially acetylated, form and be later split off with the formation of the double bond in the 7-position, which double bond also occurs in the batrachotoxinine A.

Batrachotoxinine A and especially certain 20-polyalkyl-pyrrolecarboxylic acid esters thereof, such as 20-(2,4-dimethylpyrrole-3-carboxylic acid ester) batrachotoxine and 20-(2-ethyl-4-methylpyrrole-3-carboxylic acid ester) homobatrachotoxine, are, according to T. Tokuyama, J. Daly and B. Witkop, J. Amer. Chem. Soc. 91, 3931 (1969), physiologically exceedingly effective substances. Amongst other things, they raise selectively the permeability of muscle and nerve membranes for sodium ions. The resulting sodium ion influx produces an acceleration of depolarization and hence also of muscle contraction. Since, according to recent findings, cardio-active substances of the digitalis-strophanthin type inhibit the active sodium ion transport from muscle fibers by blockage of the transport-ATP-ase of the membranes, and hence likewise raise sodium ion concentration and accelerate depolarisation and muscle contraction, the compounds of the general Formula I induce with regard to the final effect by the already mentioned different biological mechanism, therapeutic effects which are similar to those of the cardio-active digitalis substances, such as intensification of the systole and of the minute volume of the heart. The producibility of compounds with the structure similar to batrachotoxinine A, to which the process according to the invention contributes, is of importance because, the possibility is provided of producing substances of which the effect is more organo-specific than that of the above stated polyalkylpyrrolecarboxylic acid esters of batrachotoxinine A, and is reversible.

The invention is described in more detail in the following examples; these examples in no way limit the scope of the invention. The temperatures are given in degrees centigrade. The rotations are measured in chloroform; concentrations are in brackets. The IR-spectra are measured in chloroform, or in another solvent given in brackets; the absorption bands are given in cm.$^{-1}$. The taking of the UV-spectra is performed in ethanol; absorption maxima are expressed in nm., $\epsilon$-values in brackets.

Celite® is a trade name of Johns-Manville International Corporation, New York.

EXAMPLE 1

An amount of 186 mg. of 3$\beta$,18-diacetoxy-14$\beta$,15$\beta$-epoxy-20-oxo-$\Delta^{16}$-5$\alpha$-pregnene (Formula II) is refluxed for 20 minutes, in a nitrogen atmosphere, with 186 mg. of 5% palladium/barium sulphate catalyst and 855 mg. of cyclohexene in 45 ml. of methanol. The solution is then filtered off from the catalyst and concentrated in vacuo; the crude product is afterwards chromatographed in benzene/ethyl acetate solution (2:1) on silica gel. In this manner are obtained 140 mg. of 3$\beta$,18-diacetoxy-14$\beta$-hydroxy-20-oxo-$\Delta^{16}$-5$\alpha$-pregnene which, after crystallization from acetone/hexane melt at 105°. [$\alpha$]$_D$=+29° (0.42). IR.: 3550, 1725, 1665, 1605, 1240 CHCl$_3$. UV: 234 (8580).

The 3$\beta$,18-diacetoxy-14$\beta$,15$\beta$-epoxy-20-oxo-$\Delta^{16}$-5$\alpha$-pregnene used in Example 1 as starting material can be produced in the following manner:

(a) An amount of 100 g. of lead tetraacetate is dried for 2 hours in the dark at room temperature. To this are then added 20 g. of dry calcium carbonate, and the mixture is refluxed for one hour, with stirring, in 1700 ml. of absolute cyclohexane. To the boiling suspension is then added, with vigorous stirring, a hot solution of 21.8 g. of 3$\beta$-acetoxy-20$\beta$-hydroxy-5$\alpha$-pregnane in 500 ml. of absolute cyclohexane and 7.7 g. of solid iodine; the reaction mixture is thereupon refluxed, with vigorous stirring and exposure to an external 1000 watt bulb, for a further 30 minutes. A practically complete decolouration of the iodine-containing reaction mixture is thereby observed. After cooling, the reaction mixture is filtered through cotton wool, and the filtrate concentrated in vacuo. The residue after concentration is oxidised for 30 minutes, at a temperature of ca. 5°, in 800 ml. of acetone with an excess of an 8-n. solution of chromium trioxide in 8-n. sulphuric acid. An amount of 20 ml. of isopropanol is then added, the whole diluted with ethyl acetate, and washed with saturated aqueous sodium chloride solution until neutral. The crude product obtained after drying and concentration by evaporation of the organic phase is refluxed for 3 hours, with stirring, in 1500 ml. of absolute methanol with 25 g. of silver acetate. The reaction mixture is afterwards filtered through cotton wool, the filtrate concentrated in vacuo, dissolved in ether, and then filtered through neutral aluminium oxide (Act. III). The thereby obtained crude product is chromatographed on 2 kg. of silica gel Merck (particle size 0.05–0.2 mm.), which has previously been deactivated with 200 ml. of water. With a benzene/ethyl acetate mixture (10:1) are thereby eluted 7.5 g. of 3$\beta$-acetoxy-18,20-epoxy-20$\xi$-hydroxy-5$\alpha$-pregnane, M.P. 169° (recrystallized twice from acetone/hexane). [$\alpha$]$_D$=+33° (0.45). IR: 3590, 1725, 1250.

(b) An amount of 1 g. of 3$\beta$-acetoxy-18,20-epoxy-20$\xi$-hydroxy-5$\alpha$-pregnane is dissolved in a mixture of 7 ml. of pyridine and 7 ml. of acetic anhydride; the obtained solution is then heated, in a nitrogen atmosphere, for 10 hours to 95°. The solution is then allowed to cool; it is afterwards diluted with ethyl acetate and washed successively with 2-n. aqueous hydrochloric acid, saturated aqueous sodium chloride solution, saturated aqueous sodium bicarbonate solution, and again with saturated aqueous sodium chloride solution until the neutral point is obtained. The solution is then dried with magnesium sulphate, concentrated in vacuo, and the residue chromatographed on the 100-fold amount of silica gel, which has been deactivated again with 10% of water. With a benzene/ethyl acetate mixture (10:1) are thereby firstly eluted 395 mg. of 3$\beta$,18-diacetoxy-20-oxo-5$\alpha$-pregnane.

(d) An amount of 800 mg. of 3$\beta$,18-diacetoxy-20-oxo-$\Delta^{16}$-5$\alpha$-pregnene is refluxed for one hour, with stirring, with 650 mg. of N-bromosuccinimide in 50 ml. of carbon tetrachloride in the presence of 50 mg. of azobisisobutyronitrile. The reaction mixture is then allowed to cool; it is separated by filtration from the succinimide which has crystallized out, washed with carbon tetrachloride, and then concentrated in vacuo. The crude bromination product is subsequently boiled for 3 hours with 1 g. of sodium iodide in 100 ml. of acetone; the solution is concentrated in vacuo to ca. 25 ml., diluted with ethyl acetate, and successively washed with aqueous solutions of sodium thiosulphate and sodium chloride. The organic phase dried over magnesium sulphate is thereupon concentrated in vacuo, and the crude product chromatographed in benzene/ethyl acetate solution (6:1) through silica gel. Thereby are obtained 512 mg. of oily 3$\beta$,18-diacetoxy-20-oxo-$\Delta^{14,16}$-5$\alpha$-pregnadiene. IR: 1735, 1650, 1530, 1240 (CCl$_4$). U.V.: 312 ($\epsilon$=6250).

(e) To 976 mg. of 3$\beta$,18-diacetoxy-20-oxo-$\Delta^{14,16}$-5$\alpha$-pregnadiene in 40 ml. of chloroform are added 488 mg. of p-nitroperbenzoic acid, and the mixture is stirred for 19 hours at room temperature in the dark. The mixture is then diluted with ethyl acetate, and successively washed with aqueous solutions of potassium iodide, sodium thiosulphate, sodium chloride, sodium bicarbonate, and again sodium chloride until the neutral point is obtained. M.P. 107° after crystallization twice from acetone/hexane. [$\alpha$]$_D$=+70° (0.46). IR: 1740, 1710, 1240 (in CCl$_4$). Subsequent fractions consisted of 386 mg. of unmodified 3$\beta$-acetoxy-18,20-epoxy-20$\xi$-hydroxy-5$\alpha$-pregnane.

(c) An amount of 1.04 g. of 3$\beta$,18-diacetoxy-20-oxo-5$\alpha$-pregnane is brominated for 30 minutes at room temperature, with stirring, in 50 ml. of dichloromethane with 1.13 g. of 90% pyridine hydrobromide perbromide. The reaction mixture is then diluted with ethyl acetate, repeatedly washed with saturated aqueous sodium chloride solution, dried over magnesium sulphate, and concentrated in vacuo. Thereby are obtained 1.23 g. of crude 3$\beta$,18-diacetoxy-17ξ-bromo-20-oxo-5α-pregnane, which is advantageously dehydrobrominated without any purification by three hours' boiling in 20 ml. of absolute dimethylformamide under nitrogen. After cooling, the reaction mixture is diluted with ethyl acetate and washed at least five times with water. The organic phase is then dried with magnesium sulphate and concentrated in vacuo. The obtained crude product is first filtered in dichloromethane solution through neutral aluminium oxide (Act. III), and then chromatographed in benzene/ethyl acetate solution (6:1) on silica gel. Thereby are obtained 860 mg. of 3β,18-diacetoxy-20-oxo-Δ$^{16}$-5α-pregnene which, after crystallization twice from acetone/hexane, melts at 135°. $[\alpha]_D$= +44° (0.35). IR: 1725, 1670, 1590, 1250. U.V.: 238 (ϵ=8920).

The ethyl acetate phase dried with magnesium sulphate is concentrated in vacuo in a rotary evaporator, and the crude product chromatographed in benzene/ethyl acetate solution (4:1) on silica gel. Thus obtained are 550 mg. of 3β,18 - diacetoxy . 14β,15β-epoxy-20-oxo-Δ$^{16}$-5α-pregnene, M.P. 128–129° (twice crystallized from acetone/hexane). $[\alpha]_D$=+62° (0.42). IR: 1725, 1670, 1600, 1250. U.V.: 249 (ϵ=8270).

EXAMPLE 2

An amount of 83 mg. of 3β-methoxy - 3α,9α:14β,15β-diepoxy - 11α,18 - diacetoxy - 20 - oxo - Δ$^{16}$ - 5β-pregnene (see columns 5 and 6) is refluxed for 15 minutes, with vigorous stirring, in 12 ml. of methanol with 300 mg. of cyclohexene in the presence of 80 mg. of 5% palladium/barium sulphate catalyst. The solution is then filtered through Celite® and afterwards washed with dichloromethane; the filtrate is concentrated in vacuo, and the obtained crude product chromatographed in benzene/ethyl acetate solution (2:1) on silica gel. Thus obtained are 83 mg. of 3β - methoxy - 3α,9α - epoxy - 11α,18-diacetoxy - 14β - hydroxy - 20 - oxo - Δ$^{16}$ - 5β - pregnene which, after one crystallization from acetone/hexane, melt at 182°. $[\alpha]_D$=+4° (0.51). IR: 3560, 3420 broad, 1735, 1670, 1610, 1240. U.V.: 239 (8050).

The 3β - methoxy - 3α,9α:14β,15β - diepoxy - 11α,18-diacetoxy - 20 - oxo - Δ$^{16}$ - 5β - pregene used in Example 2 as starting material can be produced as follows:

(a) 10 g. (20R) - 3 - ethylenedioxy - 20 - hydroxy-Δ$^{5,9(11)}$ - pregnadien - 18 - oic acid lactone-(→20) are refluxed in 300 ml. of absolute tetrahydrofuran with 7 g. of lithium aluminium hydride for 2 hours. The excess hydride is then decomposed, with ice cooling, with ca. 5 ml. of saturated aqueous ammonium sulphate solution. An amount of 20 g. of Celite® is then added and stirring carried out for 30 minutes at room temperature; the aluminium hydroxide/Celite mixture is removed by filtration and washing performed with ethyl acetate; the filtrate is afterwards concentrated in vacuo. In this way are obtained 9.7 g. of (20R) - 3 - ethylenedioxy - 18,20 - dihydroxy - Δ$^{5,9(11)}$ - pregnadiene which, after one crystallization from methylene chloride/hexane, melts at 201°. $[\alpha]_D$=−35° (0.49). IR: 3600, 3500–3200.

(b) An amount of 10.7 g. of (20R)-3-ethylenedioxy-18,20 - dihydroxy - Δ$^{5,9(11)}$ - pregnadiene is heated in 150 ml. of glacial acetic acid, 150 ml. of methanol and 30 ml. of water with 7 drops of concentrated aqueous hydrochloric acid for 2 hours to 70°. The reaction solution is then concentrated in vacuo to dryness, the residue dissolved in 100 ml. of 5% methanolic potassium hydroxide solution, and the solution allowed to stand for 3 hours at room temperature. By the careful addition of water to this solution, the desired (20R) - 3 - oxo - 18,20 - dihydroxy - Δ$^{5,9(11)}$ - pregnadiene which, after one crystallization form. The crystals are subsequently filtered off under suction, washed with a large amount of water until neutral, dried, and recrystallized once from methanol/water. Thereby are obtained 7 g. of crystals, M.P. 194°. $[\alpha]_D$=+59° (0.61). IR: 3600, 3550–3100, 1660, 1615. U.V.: 244 (16700).

(c) An amount of 7 g. of (20R) - 3 - oxo - 18,20 - dihydroxy - Δ$^{4,9(11)}$ - pregnadiene is hydrogenated in 250 ml. of 0.1-n. ethanolic potassium hydroxide solution in the presence of 1 g. of 5% palladium charcoal catalyst with one equivalent of hydrogen. After absorption of the calculated amount of hydrogen, hydrogenation is terminated, and the solution separated from the catalyst by filtration. By the careful addition of water to the filtrate, (20R) - 3 - oxo - 18,20 - dihydroxy - Δ$^{9(11)}$ - 5β - pregnene is precipitated in crystalline form. The crystals are filtered off under suction, washed until neutral with a large amount of water, dried in vacuo, and recrystallized from methanol/water to obtain 6.7 g. of pure crystallizate, M.P. 198°. $[\alpha]_D$=−2° (0.49). IR: 3600, 3550–3200, 1705.

(d) An amount of 5.1 g. of (20R) - oxo - 18,20 - dihydroxy - Δ$^{9(11)}$ - 5β - pregnene is allowed to stand in 60 ml. of pyridine and 40 ml. of acetic anhydride for one hour at room temperature. The excess acetic anhydride is then decomposed by the careful addition of 80 ml. of methanol, whereby the temperature is maintained at ca. 0° by the addition in portions of solid carbon dioxide. The reaction solution is allowed to stand for 30 minutes at room temperature; it is afterwards concentrated in vacuo and the crude product chromatographed in benzene/ethyl acetate (1:1) on silica gel. Thereby are firstly obtained 1.5 g. of (20R) - 3 - oxo - 18,20 - diacetoxy - Δ$^{9(11)}$-5β-pregnene [IR: 1740–1700, 1250] which, by alkaline hydrolysis in 5% methanolic potassium hydroxide solution, can be reduced to the starting material of acetylation. Subsequent fractions yield 2.1 g. of (20R)-3-oxo-18 - acetoxy - 20 - hydroxy - Δ$^{9(11)}$ - 5β - pregnene which, after crystallization from methylene chloride hexane, melts at 110°. $[\alpha]_D$=0° (0.48). IR: 3580, 1730, 1710, 1250. Further fractions yield 2.0 g. of unmodified (20R)-3-oxo-18,20-dihydroxy-Δ$^{9(11)}$-5β-pregnene.

(e) An amount of 1.5 g. of (20R)-3-oxo-18-acetoxy-20 - hydroxy - Δ$^{9(11)}$ - 5β - pregnene is oxidized in 100 ml. of acetone with an excess of 8-n. solution of chromium trioxide in 8-n. sulphuric acid, with stirring, for 15 minutes at room temperature. An addition is made of 5 ml. of methanol, the whole diluted with ethyl acetate, and the organic phase washed with saturated aqueous sodium chloride solution. After drying and concentration by evaporation are obtained 1.49 g. of crude product, which is filtered in dichloromethane solution through neutral aluminium oxide (Act. III). The obtained product is crystallized from acetone/hexane, whereby are obtained 1.4 g. of 3,20 - dioxo - 18 - acetoxy - Δ$^{9(11)}$ - 5β - pregnene, M.P. 112–114°. $[\alpha]_D$=+67° (0.48). IR: 1745, 1720, 1710, 1230 (CCl$_4$).

(f) To 1.15 g. of 3,20 - dioxo - 18 - acetoxy - Δ$^{9(11)}$-5β-pregnene in 15 ml. of pyridine are added 1.2 g. of osmium tetroxide, and the whole is allowed to stand for 6.5 days in the dark at room temperature. The reaction mixture is then concentrated in vacuo, with the repeated addition of benzene, to dryness, and the residue dissolved in 40 ml. of freshly distilled dioxane. To the solution are then added 40 ml. of saturated aqueous ammonium chloride solution, and hydrogen sulphide is passed for one hour through the two-phase system. An amount of 6 g. of filter paper snippings is added and the solution heated for one hour to 70°. It is then filtered through Celite® and successively washed with 500 ml. of ethyl acetate, 100 ml. of methanol, 100 ml. of water, 100 ml. of dichloromethane, and again with 500 ml. of ethyl acetate. The filtrate is diluted with more ethyl acetate, and repeatedly washed with saturated aqueous ammonium chloride solution. The organic phase is afterwards washed with magnesium sulphate and concentrated in vacuo. Thereby are obtained 1.23 g. of crude product which is chromatographed in ethyl acetate/methanol solution (9:1) on silica gel, whereby 1.13 g. of 3β,11α-dihydroxy-3α,9α-epoxy - 18 - acetoxy - 20 - oxo - 5β - pregnane are obtained [IR: 3600–3200, 1740, 1710, 1230 (CCl$_4$)], which is further processed without purification.

(g) An amount of 775 mg. of 3β,11α-dihydroxy-3α,9α-epoxy-18-acetoxy-20-oxo-5β-pregnane is allowed to stand in 30 ml. of 0.1-n. absolute methanolic hydrogen chloride solution for 20 minutes at room temperature. The mixture is then poured on to saturated aqueous sodium bicarbonate solution; extraction is performed with ethyl acetate, and the obtained organic phase repeatedly washed with saturated aqueous sodium chloride solution. The crude product (745 mg.) obtained after concentration by evaporation of the solution dried with magnesium sulphate is acetylated in 30 ml. of acetic anhydride/pyridine mixture (1:1) for 3.5 hours at 70°. The reaction mixture is then concentrated in vacuo, and the obtained crude product filtered in dichloromethane through neutral aluminium oxide (Act. III). Thereby are obtained 805 mg. of 3β - methoxy-3α,9α-epoxy-11α,18-diacetoxy-20-oxo-5β-pregnane which, after crystallisation from acetone/hexane, melts at 151–152°. [α]$_D$=+106° (0.46). IR: 1735, 1705, 1245.

(h) 500 mg. of 3β-methoxy-3α,9α-epoxy-11α,18-diacetoxy-20-oxo-5β-pregnane are refluxed for one hour in 40 ml. of carbon tetrachloride with 208 mg. of finely powdered 96% N-bromosuccinimide and 10 mg. of azabisisobutyronitrile whilst being exposed to an external 1000 w. incandescent bulb. The reaction solution is cooled, filtered off from the precipitated succinimide, subsequently washed with carbon tetrachloride, and the filtrate concentrated in vacuo. The resulting bromination product is heated, without purification, in 40 ml. of absolute dimethylformamide with 500 mg. of lithium carbonate and 500 mg. of lithium bromide in a nitrogen atmosphere for 160 minutes to 120°. The solution is diluted with a large amount of ethyl acetate, and the organic phase washed at least five times with water. After drying and concentration by evaporation of the ethyl acetate phase are obtained 488 mg. of crystals, which are then filtered in dichloromethane through neutral aluminium oxide (Act. III). Thereby are obtained 435 mg. of 3β-methoxy-3α,9α-epoxy-11α,18-diacetoxy - 20 - oxo-Δ$^{16}$-5β-pregnene which, after being crystallized twice (307 mg.), melt at 167–168°. [α]$_D$=+61° (0.53) IR: 1730, 1668, 1590, 1245. U.V.: 237 (8750). A further 37 mg. of product can be obtained by chromatography of the mother liquor in hexane/acetone solution (3:1) through silica gel, and subsequent crystallization from acetone/hexane.

(i) An amount of 500 mg. of 3β-methoxy-3α,9α-epoxy-11α,18-diacetoxy-20-oxo-Δ$^{16}$-5β-pregnene is refluxed for 17 minutes in 150 ml. of carbon tetrachloride with 240 mg. of 96% N-bromosuccinimide and 20 mg. of azabisisobutyronitrile, whilst being exposed to an external 1000 watt incandescent lamp. The reaction solution is then cooled and filtered off from the precipitated succinimide. The residue obtained after concentration by evaporation of the filtrate is dissolved in 50 ml. of absolute dimethylformamide, and the solution heated with 500 mg. of lithium bromide and 500 mg. of lithium carbonate, under nitrogen and with stirring, to 130° for 10 minutes. The solution is then extensively concentrated in vacuo, diluted with ethyl acetate, and repeatedly washed with water. The crude product obtained after drying and concentration by evaporation of the organic phase is chromatographed in a benzene/ethyl acetate solution (2:1) through silica gel, whereby 330 mg. of 3β-methoxy-3α,9α-epoxy-11α,18-diacetoxy-20-oxo-Δ$^{14,16}$-5β - pregnadiene are obtained which, after one crystallization from acetone/hexane, melts at 146–147°. [α]$_D$=+302° (0.50). IR: 1730, 1645, 1525, 1465, 1245, 845. U.V.: 312 (10550).

(j) An amount of 250 mg. of 3β-methoxy-3α,9α-epoxy-11α,18-diacetoxy-20-oxo-Δ$^{14,16}$-5β-pregnadiene, chromatographically purified but not recrystallized, is refluxed for 80 minutes with 500 mg. of p-nitroperbenzoic acid in a mixture of 100 ml. of chloroform and 1 ml. of absolute methanol. The reaction solution is then diluted with ethyl acetate, and successively washed with ice cold aqueous solutions of sodium iodide, sodium thiosulphate, sodium chloride, sodium bicarbonate, and again sodium chloride. The crude product obtained after concentration by evaporation of the organic phase is chromatographed in hexane/acetone solution (2:1) on silica gel. Thereby are obtained 210 mg. of 3β-methoxy-3α,9α:14β,15β-diepoxy-11α,18-diacetoxy - 20 - oxo-Δ$^{16}$-5β-pregnene which, after three crystallizations from acetone/hexane, melts at 198°. [α]$_D$=+66° (0.58). IR: 1735, 1670, 1605, 1240. U.V.: 248 (6890).

EXAMPLE 3

An amount of 150 mg. of 3β-acetoxy-14β,15β-epoxy-20 - oxo - Δ$^{16}$ - 5α - pregnene [Helv. Chim. Acta 30, 385 (1947)] is refluxed for 15 minutes, with stirring, in 45 ml. of methanol in the presence of 150 mg. of 5% palladium barium sulphate catalyst with 5.7 ml. of cyclohexene. The solution is then filtered off from the catalyst and concentrated in vacuo. The obtained crude product is chromatographed on silica gel in benzene/ethyl acetate. By this means are obtained 57 mg. of unmodified starting material, and 62 mg. of 3β-acetoxy-14β-hydroxy-20-oxo-Δ$^{16}$-5α-pregnene which, after two crystallizations from acetone/hexane, melt at 193–196°. [α]$_D$=0° (0.4). U.V.: 240 (10100). IR: 3580, 1720, 1665, 1605, 1250.

EXAMPLE 4

An amount of 187 mg. of 3β,18-diacetoxy-14β-hydroxy-20-oxo-Δ$^{16}$-5α-pregnene (final material of Example 1) is exhaustively hydrogenated, at room temperature and normal pressure, in 50 ml. of ethanol in the presence of 140 mg. of 5% palladium charcoal catalyst. The catalyst is then removed by filtration, the filtrate concentrated by evaporation, and the residue chromatographed in benzene/ethyl acetate solution (1:1) on silica gel. Thereby obtained are 172 mg. of oily 3β,18-diacetoxy-14β-hydroxy-20-oxo-5α,17α-pregnane. This is identical to the hydrogenation product obtained under the same conditions from the starting material of Example 1. IR: 3600–3200 broad, 1735, 1240 (CCl$_4$).

EXAMPLE 5

(a) An amount of 133 mg. of 3β-methoxy-3α, 9α-epoxy - 11α,18-diacetoxy-14β-hydroxy-20-oxo-Δ$^{16}$-5β-pregnene (see Example 2) is exhaustively hydrogenated in 40 ml. of ethanol in the presence of 100 mg. of 5% palladium charcoal catalyst. The solution is then separated by filtration from the catalyst, and concentrated in vacuo. Chromatography of the crude hydrogenation product in benzene/ethyl acetate solution (2:1) on silica gel yields 110 mg. of 3β-methoxy-3α,9α-epoxy-11α,18-diacetoxy-14β-hydroxy-20-oxo-5β,17α-pregnane, which, after one crystallization from acetone/hexane, melts at 154°. [α]$_D$=0° (0.40). IR: 3600, 3400 broad, 1735, 1705, 1245.

(b) The same hydrogenation product is obtained by hydrogenating, instead of the final material of Example 2, the starting material thereof as follows:

An amount of 100 mg. of 3β-methoxy-3α,9α:14β,15β-diepoxy - 11α,18-diacetoxy-29-oxo-Δ$^{16}$-5β-pregnene is exhaustively hydrogenated in 20 ml. of ethanol in the presence of 40 mg. of 5% palladium on barium sulphate. The catalyst is then removed by filtration, the filtrate concentrated by evaporation, and the obtained crude product chromatographed in benzene/ethyl acetate solution (1:1) on silica gel. Thereby obtained are 55 mg. of 3β-methoxy-3α,9α-epoxy-11α,18-diacetoxy-14β-hydroxy-20 - oxo - 5β, 17α-pregnane which, after one crystallization from acetone/hexane, melts at 154°. [α]$_D$=0° (0.40). IR: 3600, 3400 broad, 1735, 1705, 1245.

EXAMPLE 6

An amount of 250 mg. of (20R)-3-oxo-6α,7α-epoxy-9α,20-dihydroxy-11α-acetoxy-Δ$^4$-pregnen-18-oic acid lactone-(→20) is refluxed for 13 minutes, with vigorous stirring, with 170 mg. of palladium/barium sulphate catalyst (5% Pd) and 1 ml. of purest cyclohexene in 50 ml.

of abs. methanol. The catalyst is then filtered off, and the filtrate concentrated in vacuo to dryness. Chromatography of the residue in ethyl acetate/chloroform methanol-(10:10:1)-mixture on purest silica gel (Merck, 0.05–0.2 mm.) yields 115 mg. of (20R)-3-oxo-7α,9α,20-trihydroxy-11α-acetoxy-Δ$^4$-pregnen-18-oic acid lactone-(→20). IR: 3580, 1755, 1670, 1605, 1245.

This reaction product is optionally further processed as follows: It is dissolved in 15 ml. of methanol and hydrogenated in the presence of 28 mg. of palladium charcoal catalyst (5% Pd) at room temperature and normal pressure until the hydrogen absorption ceases. The catalyst is then filtered off, and the filtrate concentrated by evaporation, whereby 114 mg. of substance of (20R)-3β,7α,20-trihydroxy-3α,9α-epoxy-11α-acetoxy-5β-pregnan-18-oic acid lactone-(→20) remain behind. The residue is dissolved in 5 ml. of 0.01-n. methanolic hydrogen chloride solution and the solution allowed to stand for one hour at room temperature. The solution is then concentrated in vacuo to dryness, and chromatographed in ethyl acetate/chloroform/methanol-(10:10:1)-mixture on silica gel (0.05–0.2 mm.), whereby 70 mg. of (20R)-3β-methoxy-3α,9α-epoxy-7α,20-dihydroxy-11α-acetoxy-5β-pregnan-18-oic acid lactone-(→20) are eluted which, after two crystallizations from acetone/hexane, melt at 222–223°. [α]$_D$=+5° (0.45). IR: 3520, 2840, 1755, 1744, 1245.

The starting material of Example 6 is produced as follows:

(a) 6.03 g. of (20R)-3-oxo-20-hydroxy-Δ$^{4,9(11)}$-pregnadien-18-oic acid lactone-(→20) are allowed to stand in 70 ml. of pyridine with 5 g. of osmium tetroxide for 14 hours in darkness at room temperature. The reaction mixture is then concentrated in vacuo to dryness with repeated addition of benzene; the residue is afterwards dissolved in 450 ml. of dioxane; to the solution are added 300 ml. of saturated aqueous ammonium chloride solution, and hydrogen sulphide is passed through for one hour. To the solution are added 30 g. of filter paper snippings, and the mixture is heated to 80° for 2 hours. The mixture is then filtered through Celite, the filter residue washed with ethyl acetate and methanol, and the filtrate concentrated in vacuo. The residue is dissolved in ethyl acetate, the solution washed with saturated sodium chloride solution, dried with magnesium sulphate, and concentrated in vacuo, whereby crude (20R)-3-oxo-9α,11α,20-trihydroxy-Δ$^4$-pregnen-18-oic acid lactone-(→20) is obtained.

The above crude product is allowed to stand with 50 ml. of acetic anhydride/pyridine-(1:1)-mixture for 14 hours at room temperature. The reaction solution is then concentrated in vacuo, the residue dissolved in methylene chloride, and filtered through neutral aluminum oxide (Activation III) and concentrated by evaporation. The residue of 5.45 g. of crude product is chromatographed in ethyl acetate on silica gel (0.05–0.2 mm.), whereby 3.38 g. of (20R)-3-oxo-9α,20-dihydroxy-11α-acetoxy-Δ$^4$-pregnen-18-oic acid lactone-(→20) are obtained which, after two crystallizations from acetone/hexane, melts at 246°. [α]$_D$=+86° (0.50). IR: 3580, 1750, 1670, 1625, 1250. U.V.: 241 (12600).

The starting material of (a) is described in Helv. Chem. Acta 44, 1374–1380 (1961) and 45, 1317–1343 (1962).

(b) An amount of 1.075 g. of the reaction product of (a) is dissolved in 80 ml. of a 0.3-n. solution of hydrogen chloride in dioxane. To the solution are then added in portions at room temperature, with stirring and in the course of 5 hours, 660 mg. of 2,3-dichloro-5,6-dicyano-p-benzoquinone. After a further hour, the reaction solution is diluted with ethyl acetate; the solution is washed first with saturated aqueous sodium bicarbonate solution and then with saturated sodium chloride solution; it is afterwards dried with sodium sulphate and concentrated in vacuo. The obtained crude product is first dissolved in ethyl acetate, the solution filtered through neutral aluminium oxide (Activation III), and subsequently chromatographed from ethyl acetate solution on silica gel (0.05–0.2 mm.). Thereby are obtained 736 mg. of (20R)-3-oxo-9α,20-dihydroxyl-11α-acetoxy-Δ$^{4,6}$-pregnadien-18-oic acid lactone-(→20), which melt, after two crystallizations from acetone/hexane, at 236–237°. [α]$_D$=+10° (0.45). IR: 3570, 1750, 1665, 1630, 1590, 1245, U.V.: 285 (20100).

(c) An amount of 762 mg. of the reaction product of (b) is stirred in 90 ml. of chloroform with 762 mg. of p-nitroperbenzoic acid for 4 hours in darkness at room temperature. The reaction solution is thereupon diluted with ethyl acetate, and successively washed with aqueous solutions of potassium iodide, sodium thiosulphate, sodium chloride, sodium bicarbonate, and again with sodium chloride. After concentration by evaporation of the organic phase are obtained 790 mg. of crude product, which are chromatographed in ethyl acetate on silica gel (0.05–0.2 mm.). Thereby are eluted 556 mg. of (20R)-3-oxo-6α-7α-epoxy-9α,20-dihydroxy-11α-acetoxy-Δ$^4$-pregnen-18-oic acid lactone-(→20), which melt, after two crystallizations from acetone/hexane, from 270° with decomposition. [α]$_D$=+70° (0.45). IR: 3440, 1750, 1680, 1625, 1240. U.V.: 235 (12900).

EXAMPLE 7

An amount of 56 mg. of 3,20-dioxo-6α,7α-epoxy-9α-hydroxy-11α,18-diacetoxy-Δ$^4$-pregnene is refluxed for 20 minutes, with vigorous stirring, with 14 mg. of palladium/barium sulphate catalyst in 6 ml. of a dioxane/cyclohexene-(50:1)-mixture. The catalyst is then filtered off, the filtrate concentrated in vacuo, and subsequently chromatographed on purest silica gel, 0.05–0.2 mm. Merck. Used as solvent is ethyl acetate/chloroform/methanol-(10:10:1)-mixture. By this means are obtained 45 mg. of 3,20-dioxo-7α,9α-dihydroxy-11α,18-diacetoxy-Δ$^4$-pregnene which, after two crystallizations from acetone/hexane, melts at 265–267°. [α]$_D$=+91° (0.22). IR: 3580, 3440, 1740, 1710, 1670, 1620, 1240. U.V.: 241 (13800).

The starting material of Example 7 is produced as follows:

(a) To 11.53 g. of (20R)-3-oxo-18,20-dihydroxy-Δ$^{4,9(11)}$-pregnadiene in 700 ml. of methanol/dichloromethane-(2:1)-mixture are simultaneously added at −20°, with stirring, 120 ml. of 30% aqueous hydrogen peroxide solution and 45 ml. of 4-n aqueous potassium hydroxide solution. The mixture is then stirred for 60 hours at 4°. It is afterwards diluted with ethyl acetate, and successively washed with the aqueous solutions of sodium chloride, potassium iodide, sodium thiosulphate, and again with sodium chloride. The crude product obtained after drying and concentration by evaporation of the organic phase is chromatographed in an ethyl acetate/chloroform/methanol-(10:10:1)-mxture on silica gel (0.05–0.2 mm.). Hereby are first eluted 2.53 g. of (20R)-3-oxo-4β,5β-epoxy-18,20-dihydroxy-Δ$^{9,(11)}$-pregnene which, after crystallization twice from acetone/hexane, melts at 215–216°. [α]$_D$=+122° (0.50). IR: 3610, 3500–3400, 1710.

Subsequent fractions of 4.7 g. in all consist, according to thin layer analysis [solvent system: ethyl acetate/chloroform/methanol-(10:10:1)], of a mixture of the aforestated 4β,5β-epoxy compound with isomeric (20R)-3-oxo-4α,5β-epoxy-18,20-dihydroxy-Δ$^{9(11)}$-pregnene. Finally are further eluted 160 mg. of the last-mentioned, which melt, after two crystallizations from ether/diisopropyl ether, at 155°. [α]$_D$=−117° (0.50). IR: 3600, 3550–3100, 1705.

(b) To 1.631 g. of the (20R)-3-oxo-4β,5β-epoxy-18,20-dihydroxy-Δ$^{9(11)}$-pregnene first eluted under (a) are added 30 ml. of an acetic anhydride/pyridine-(1:2)-mixture, and the whole is allowed to stand for 20 minutes at room temperature. The excess acetic anhydride is then decomposed by the careful addition of 35 ml. of methanol, whereby the temperature is maintained at 0° by the addition of Dry Ice. After one hour's standing at room temperature, the mixture is concentrated in vacuo, and chromatographed in an ethyl acetate/chloroform mixture-(1:1) on silica gel (0.05–0.2 mm.). An amount of 540 mg. of (20R)-3-oxo-4β,5β-epoxy-18-acetoxy-20-hydroxy-Δ9(11)-pregnene is thereby eluted which, after two crystallizations from acetone/hexane, melts at 105–106°. [α]$_D$=+134° (0.46). IR: 3580, 1740, 1715, 12.35.

Subsequent fractions yield 806 mg. of unreacted starting material.

The starting material of (a) is described in Helv. Chem. Acta 53, 2267–2275 (1970).

(c) To 500 mg. of the reaction product of (b) in 25 ml. of acetone is added, at room temperature, an excess of 8-n chromium trioxide in 8-n sulphuric acid, and the whole allowed to stand for 15 minutes. To the mixture are then added 5 ml. of isopropanol; the mixture is diluted with ethyl acetate, and washed with saturated aqueous sodium chloride solution. After drying and concentration in vacuo are obtained 490 mg. of crude product, which is chromatographed in an ethyl acetate/chloroform-1:1)-solution on silica gel (0.05–0.2 mm.), and subsequently recrystallized twice from acetone/hexane. Thus obtained are 418 mg. of 3,20-dioxo-4β,5β-epoxy-18-acetoxy-Δ9(11)-pregnene, M.P. 114–116°. [α]$_D$=+187° (0.53). IR: 1740, 1705, 1240.

(d) An amount of 390 mg. of 3.20-dioxo-4β,5β-epoxy-18-acetoxy-Δ9(11)-pregnene is allowed to stand in 16 ml. of pyridine with 400 mg. of osmium tetroxide for 14 hours in darkness at room temperature. The reaction mixture is then concentrated in vacuo with the repeated addition of benzene; the residue is dissolved in 90 ml. of dioxane, and to the solution are added 60 ml. of a saturated aqueous ammonium chloride solution. Hydrogen sulphide is passed through for one hour; 5 g. of filter paper snippings are then added, and the mixture is heated to 80° for 2 hours. It is then filtered through Celite, the filter residue afterwards washed with ethyl acetate and ethanol, and the filtrate concentrated in vacuo; the obtained residue is thereupon dissolved in ethyl acetate, the solution washed with saturated aqueous sodium chloride solution, and concentrated in vacuo.

The crude 3,20-dioxo-4β,5β-epoxy-9α,11α-dihydroxy-18-acetoxy-pregnane remaining behind is allowed to stand in 10 ml. of acetic anhydride/pyridine-(1:1)-mixture for 14 hours at room temperature. The reaction mixture is then concentrated in vacuo; the residue is dissolved in ethyl acetate, the solution filtered through aluminium oxide (Activation III), and subsequently chromatographed in ethyl acetate/chloroform-(1:1)-solution on silica gel (Merck, 0.05–0.2 mm.). Thus obtained are 380 mg. of 3,20-dioxo - 4β,5β - epoxy-9α-hydroxy-11α,18-diacetoxy-pregnane, which melt, after recrystallization twice from acetone/hexane, at 231–232°. [α]$_D$=+169° (0.36). IR: 3580, 1740, 1705, 1245.

(e) An amount of 360 mg. of 3,20-dioxo-4β,5β-epoxy-9α-hydroxy-11α,18-diacetoxy-pregnane is refluxed with 360 mg. of sodium iodide in 40 ml. of glacial acetic acid for 30 minutes whilst stirring is maintained. The reaction mixture is then concentrated in vacuo; the residue is dissolved in ethyl acetate, and this solution subsequently successively washed with the aqueous solutions of sodium thiosulphate, sodium chloride, sodium bicarbonate, and again sodium chloride. The organic phase is then concentrated in vacuo, and the residue chromatographed in ethyl acetate/chloroform/methanol-(10:10:1)-mixture on silica gel (Merck, 0.05–0.2 mm.). Thus obtained are ca. 280 mg. of 3,20 - dioxo - 9α - hydroxy - 11α,18-diacetoxy-Δ4-pregnene, which melt, after two crystallizations from acetone/hexene, at 196–197°. [α]$_D$=+166° (0.52). IR: 3580, 1740, 1708, 1670, 1618, 1240. U.V.: 242 (14600).

(f) Instead of the 4β,5β-epoxy compound obtained under 7(a) and thereby first eluted, it is also possible to convert the thereby last eluted (20R)-3-oxo-4α,5α-epoxy-18,20-dihydroxy-Δ9(11)-pregnene, according to the reaction sequences 7(b) to 7(e), into the reaction product of 7(e): 3,20-dioxo-9α-hydroxy-11α,18-diacetoxy-Δ4-pregnene.

Analogously to 7(b) is obtained (20R)-3-oxo-4α,5α-epoxy-18-acetoxy-20-hydroxy-Δ9(11)-pregnene, M.P. 130° (twice recrystallized from ether/diisopropyl ether), [α]$_D$=—125° (0.64), IR: 3580, 1735, 1710, 1250;

Analogously to 7(c) is obtained 3,20-dioxo-4α,5α-epoxy-18-acetoxy-Δ9(11)-pregnene, M.P. 135° (twice recrystallized from ether/diisopropyl ether), [α]$_D$=—22° (0.60), IR: 1735, 1710, 1250;

Analogously to 7(d) is obtained 3,20-dioxo-4α,5α-epoxy - 9α - hydroxy - 11α,18 - diacetoxy - pregnane, [α]$_D$=+27° (0.52), IR: 3570, 1735, 1707, 1250.

(g) It is possible, likewise analogously to 7(b) to 7(e), to advantageously convert a mixture of the 4β,5β-epoxy compound and 4α,5α-epoxy compound, obtained according to 7(a), into the homogeneous reaction product of 7(e), whereby the only operation dispensed with is purification by recrystallization. As the starting mixture, it is possible to use the medium fractions from the chromatography of 7(a), the medium and final fractions from this chromatography operation, or also the reaction product of 7(a) not chromatographically fractionated.

(h) An amount of 470 mg. of 3,20-dioxo-9α-hydroxy-11α,18-diacetoxy-Δ4-pregnene, obtained according to (e), (f) or (g), is dissolved in 50 ml. of a 0.45-n. solution of hydrogen chloride in dioxane, and to this solution are added in portions at room temperature, with stirring and in the course of one hour, 260 mg. of 2,3-dichloro-5,6-dicyano-p-benzoquinone. The mixture is thereupon diluted with ethyl acetate, washed with saturated aqueous sodium bicarbonate solution and then with saturated sodium chloride solution; the organic phase is afterwards dried with magnesium sulphate and concentrated in vacuo. The residue is dissolved in ethyl acetate, the solution first filtered through neutral aluminum oxide (Activation III) and subsequently chromatographed in an ethyl acetate/chloroform/methanol-(10:10:1)-mixture on silica gel (Merck, 0.05–0.2 mm.), whereby 360 mg. of 3,20-dioxo-9α-hydroxy-11α,18-diacetoxy-Δ4,6-pregnadiene are eluted, the melting point of which, after two crystallizations from acetone/hexane, is 202°. [α]$_D$=+129° (0.29). IR: 3570, 1740, 1710, 1665, 1599, 1245. U.V.: 285 (24500).

(i) An amount of 185 mg. of the reaction product of (h) is stirred in 30 ml. of chloroform with 185 mg. of p-nitroperbenzoic acid for 4 hours in darkness at room temperature. The reaction mixture is then diluted with ethyl acetate, and successively washed with the aqueous solutions of potassium iodide, sodium thiosulphate, sodium chloride, sodium bicarbonate, and again sodium chloride, dried with magnesium sulphate, and concentrated by evaporation. The residue is chromatographed in an ethyl acetate/chloroform/methanol-(10:10:1)-mixture on silica gel (Merck, 0.05–0.2 mm.), whereby are obtained, after dissolving and crystallizing twice from acetone/hexane, 105 mg. of 3,20-dioxo-6α,7α-epoxy-9α-hydroxy-11α,18-diacetoxy-Δ4-pregnene, M.P. 200–201°. [α]$_D$=+177° (0.30). IR: 3440, 1740, 1710, 1680, 1625, 1245. The low position of the hydroxyl band is due to intramolecular hydrogen bridge formation between the 9α-hydroxyl group and 6α,7α-epoxy oxygen, since frequency and relative intensity of 0.2% and 0.012% chloroform solutions remain unchanged. U.V.: 236 (15200).

Subsequent chromatogram fractions further yield 56 mg. of starting material.

EXAMPLE 8

An amount of 48 mg. of 3β-methoxy-3α,9α:14β,15β-diepoxy-7α,11α-18-triacetoxy-20-oxo-Δ16-5β-pregnene is refluxed for 30 minutes, with vigorous stirring, in 5 ml. of dioxane with 100 mg. of cyclohexene in the presence of 48 mg. of palladium charcoal catalyst (5% Pd). The reaction solution is then filtered through Celite, the filter residue washed with dichloromethane, the filtrate concentrated in vacuo, and the obtained crude product chromatographed in ethyl acetate/chloroform-(1:1) on silica gel (Merck, 0.05–0.2 mm.); thereby are obtained 20 mg. of 3β-methoxy-3α,9α-epoxy-7α,11α,18-triacetoxy-14β-hydroxy-20-oxo-Δ¹⁶-5β-pregnene. IR: 3580, 1735, 1670, 1615, 1250. U.V.: 238 (9100).

The epoxide required for Example 8 is produced as follows:

(a) 45 mg. of 3,20-dioxo-7α,9α-dihydroxy-11α,18-diacetoxy-Δ⁴-pregnene (produced according to Example 7 and chromatographically purified, but not recrystallized) are hydrogenated in 10 ml. of methanol, in the presence of 15 mg. of palladium charcoal catalyst (5% Pd) and at room temperature and at normal pressure, until the hydrogen absorption ceases. The catalyst is thereupon filtered off, and the crude 3β,7α-dihydroxy-3α,9α-epoxy-11α,18-diacetoxy-20-oxo-5β-pregnane present in the filtrate converted, by the addition of 1 ml. of 0.05-n. methanolic hydrogen chloride solution and the standing for one hour at room temperature, into the 3β-methoxy derivative. The last-mentioned is isolated by evaporating off the solvent in vacuo, and chromatographing the residue in an ethyl acetate/chloroform/methanol-(10:10:1)-mixture on silica gel (Merck, 0.05-0.2 mm.), whereby 27 mg. of 3β-methoxy-3α,9α-epoxy-7α-hydroxy-11α,18-diacetoxy-20-oxo-5β-pregnane are obtained, which melt, after two crystallizations from acetone/hexane, at 167–168°. [α]$_D$=+78° (0.30). IR: 3500, 2830, 1735 (broad), 1255.

(b) An amount of 720 mg. of 3β-methoxy-3α,9α-epoxy-7α-hydroxy - 11α,18 - diacetoxy - 20 - oxo - 5β-pregnane is heated in 30 ml. of an acetic anhydride/pyridine-(1:1)-mixture, in a nitrogen atmosphere, to 130° (bath temperature) for 6 hours. The reaction mixture is then concentrated in vacuo, and the residue chromatographed in an ethyl acetate/chloroform-(1:1)-solution on silica gel (Merck, 0.05-0.2 mm.). Thereby obtained are 470 mg. of 3β-methoxy-3β,9α-epoxy-7α,11α,18-triacetoxy-20-oxo-5β-pregnane which, after crystallization from acetone/hexane, melts at 146–147°. [α]$_D$=+81° (0.64). IR: 1735, 1710, 1245.

(c) 470 mg. of 3β-methoxy-3α,9α-epoxy-7α,11α,18-triacetoxy-20-oxo-5β-pregnane are refluxed for 45 minutes in 40 ml. of carbon tetrachloride with 200 mg. of N-bromosuccinimide, with the addition of 10 mg. of azobisisobutyronitrile, whilst exposed to an external 1000 w. incandescent lamp. The reaction mixture is then filtered off from the succinimide present, and the filtrate concentrated in vacuo. The obtained crude bromination product is dissolved in 40 ml. of abs. dimethylformamide, 470 mg. of lithium bromide and 470 mg. of lithium carbonate are added, and the mixture is heated, under nitrogen, to 130° for 2½ hours. It is then concentrated in vacuo, diluted with ethyl acetate, and washed repeatedly with water. The crude product obtained after drying and concentration by evaporation of the organic phase is chromatographed in an ethyl acetate/chloroform-(1:1)-mixture on silica gel (Merck, 0.05-0.2 mm.). Thereby are eluted 265 mg. of 3β-methoxy-3α,9α-epoxy-7α,11α,18-triacetoxy - 20 - oxo - Δ¹⁶-5β-pregnene, which melt, after crystallization from acetone/hexane, at 187–188°. [α]$_D$=+53° (0.54). IR: 1730, 1670, 1595, 1240. U.V.: 235 (8550).

(d) An amount of 265 mg. of 3β-methoxy-3α,9α-epoxy-7α,11α,18-triacetoxy-20-oxo-Δ¹⁶-pregnene and 110 mg. of N-bromosuccinimide as well as 10 mg. of aziobisisobutyronitrile are refluxed for 20 minutes in 40 ml. of carbon tetrachloride, whilst being exposed to an external 1000 w. incandescent lamp. The reaction mixture is then cooled, filtered off from the precipitated succinimide, and the filtrate concentrated in vacuo. The crude bromination product is heated under nitrogen with 265 mg. of lithium bromide and 265 mg. of lithium carbonate in 20 ml. of abs. dimethylformamide to 130° for 15 minutes. The mixture is thereupon concentrated in vacuo, the residue taken up in ethyl acetate, and the solution repeatedly washed with water. The crude product obtained after concentration in vacuo is chromatographed in a benzene/ethyl acetate-(1:1)-solution on silica gel (Merck, 0.05-0.2 mm.). Thereby eluted are 185 mg. of hitherto amorphous 3β-methoxy-3α,9α-epoxy-7α,11α-18-triacetoxy-20-oxo-Δ¹⁴,¹⁶-5β-pregnadiene. IR: 1735, 1640, 1530, 1465, 1240, U.V.: 308 (11200).

(e) 187 mg. of 3β - methoxy - 3α,9α-epoxy-7α,11α,18-triacetoxy-20-oxo-Δ¹⁴,¹⁶-5β - pregnadiene are allowed to stand in 18 ml. of a chloroform/methanol-(100:1)-mixture with 185 mg. of p-nitroperbenzoic acid in darkness for 24 hours at room tempreature. The reaction mixture is then diluted with ethyl acetate, and washed successively with aqueous solutions of sodium iodide, sodium thiosulphate, sodium chloride, sodium bicarbonate, and again sodium chloride. The organic phase is thereupon dried over magnesium sulphate, concentrated in vacuo, and chromatographed in an ethyl acetate/chloroform-(1:1)-mixture on silica gel (Merck, 0.05-0.2 mm.). Thereby are eluted 109 mg. of 3β-methoxy-3α,9α: 14β,15β-diepoxy-7α,11α,18-triacetoxy-20-oxo-Δ¹⁶ - 5β - pregnene. IR:1735, 1670, 1605, 1250. U.V.:245 (7550).

What we claim is:

1. Process for the production of a member selected from the group consisting of compounds of the formulae

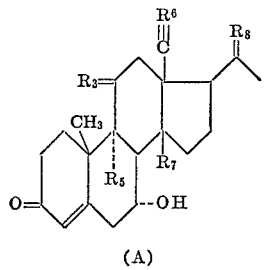 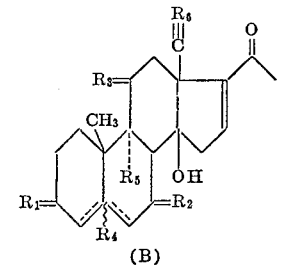

(A)            (B)

wherein
the dotted lines in the rings means that there is possibly present a double bond in a position extending from the 5 carbon atom to either the 4- or 6-position, or in either of these positions, and $R_1$ represents an oxo or lower alkanedioxy group, a free, or an esterified or etherified hydroxyl group and a hydrogen atom or, when taken together with $R_5$ a 3α,9α-epoxy group together with a free or an esterfield or an etherified hydroxyl group, $R_2$ and $R_3$ each represent an oxo or lower alkanedioxy group or a free, an esterified or etherified hydroxyl group and a hydrogen atom, or two hydrogen atoms, $R_4$ represents a hydrogen atom in the α- or β-position or is part of a double bond as indicated, $R_5$ represents a hydrogen atom, a hydroxyl or together with $R_1$ an epoxy group, $R_6$ represents three hydrogen atoms or a free, an esterified or etherified hydroxyl group and two hydrogen atoms, or, when taken together with $R_8$ an oxo group together with an 18,20-epoxy group, $R_7$ represents a hydrogen atom and $R_8$ represents an oxo group, or, when taken together with $R_6$ an epoxy group and a hydrogen atom, and whereby a double bond may be in the 5,6-position only when $R_1$ does not represent a free oxo group, wherein in a member selected from the group consisting of a compound of the formulae

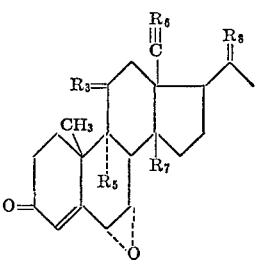 or 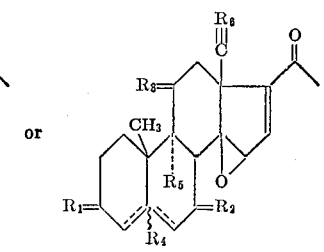

wherein all the symbols have the same meaning, is reacted with a partially hydrogenated aromatic hydrocarbon selected from the group consisting of a mononuclear aromatic hydrocarbon in which one or two double bonds are hydrogenated and of 1,4,5,8-tetrahydronaphthalene in the presence of a palladium hydrogenation catalyst.

2. Process according to claim 1, characterized in that as starting material 3β,18 - diacetoxy-14β,15β-epoxy-20-oxo-Δ$^{16}$-5α-pregnene is used.

3. Process according to claim 1, characterized in that as starting material 3β-methoxy-3α,9α:14β,15β-diepoxy-11α,18-diacetoxy-20-oxo-Δ$^{16}$-5β-pregnene is used.

4. Process according to claim 1, characterized in that as starting material 3β-acetoxy-14β,15β-epoxy-20-oxoΔ$^{16}$-5α-pregnene is used.

5. Process according to claim 1, characterized in that as starting material (20R)-3-oxo-6α,7α-epoxy-9α-20-dihydroxy-11α-acetoxy-Δ$^4$-pregnen-18-oic acid lactone (→20) is used.

6. Process according to claim 1, characterized in that as starting material 3,20-dioxo-6α,7α-epoxy-9α-hydroxy-11α,18-diacetoxy-Δ$^4$-pregnene is used.

7. Process according to claim 1, characterized in that as starting material 3β-methoxy-3α,9α:14β,15β-diepoxy-7α,11α,18-triacetoxy-20-oxo-Δ$^{16}$-5β-pregnene is used.

8. Process according to claim 1, characterized in that the catalyst used is palladium on an alkaline earth metal sulphate or carbonate.

9. Process according to claim 1, characterized in that the catalyst used is palladium on barium sulphate.

10. Process according to claim 1, characterized in that the catalyst used is palladium on animal charcoal.

11. Process according to claim 1, characterized in that the partially hydrogenated aromatic hydrocarbon used is cyclohexene, cyclohexa-1,3-diene or -1,4-diene, or 1,4,5,8-tetrahydronaphthalene.

12. Process according to claim 1, characterized in that the reaction is performed in a solvent at temperatures of between 35 and 150° C., or at the boiling temperature of the reaction medium.

13. A member selected from the group consisting of a compound of the formulae

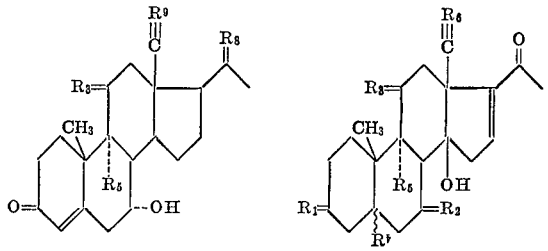

wherein $R_1$ represents a free hydroxyl group or a hydroxyl group esterified with a lower alkanoic acid or a hydroxyl group etherified with a lower aliphatic alcohol together with a hydrogen atom or, when taken together with $R_5$, a free hydroxyl group or a hydroxyl group esterified with a lower alkanoic acid or a hydroxyl group etherified with a lower aliphatic alcohol together with a 3α, 9α-epoxy group, $R_2$ represents two hydrogen atoms or a hydrogen atom together with a free hydroxyl group or with a lower alkanoyloxy group, $R_3$ represents two hydrogen atoms or a hydrogen atom together with a free hydroxyl group or a hydroxyl group esterified with a lower alkanoic acid $R_4$ represents a hydrogen atom in the α- or β-position, $R_5$ represents a hydrogen atom, a hydroxyl group or, when taken together with $R_1$ an apoxy group, $R_6$ represents three hydrogen atoms or a free hydroxyl group or a hydroxyl group esterified with a lower alkanoic acid together with two hydrogen atoms, or, when taken together with $R_8$, an oxo group together with an 18,20-epoxy group, $R_8$ represents a free oxo group, or when taken together with $R_6$, an epoxy group and a hydrogen atom, and esters of the 7α-hydroxy compounds shown in the first formula derived from lower aliphatic carboxylic acids.

14. A compound according to claim 13, which is 3α,18-diacetoxy-14β-hydroxy-20-oxo-Δ$^{16}$-5α-pregnene.

15. A compound according to claim 13, which is 3β-methoxy-3α,9α-epoxy-11α,18-diacetoxy,14β - hydroxy-20-oxo-Δ$^{16}$-5β-pregnene.

16. A compound according to claim 13, which is (20R) - 3 - oxo - 7α,9α,20 - trihydroxy-11α-acetoxy-Δ$^4$-pregnen-18-oic acid lactone (→20).

17. A compound according to claim 13, which is 3,20-dioxo-7α,9α-dihydroxy-11α,18-diacetoxy-Δ$^4$-pregnene.

18. A compound according to claim 13, which is 3β-methoxy-3α,9α-epoxy-7α,11α,18 - triacetoxy-14β-hydroxy-20-oxo-Δ$^{16}$-5β-pregnene.

19. A compound according to claim 13, which is 3β-acetoxy-14β-hydroxy-20-oxo-Δ$^{16}$-5α-pregnene.

No references cited.

ELBERT L. ROBERTS, Primary Examiner

U.S. Cl. X.R.
260—239.57, 397.45